United States Patent
Herrington

[15] 3,685,708
[45] Aug. 22, 1972

[54] MOUNTING RACK

[72] Inventor: Franklin L. Herrington, Route 1, Doctor's Inlet, Fla. 32030

[22] Filed: Feb. 11, 1970

[21] Appl. No.: 10,371

[52] U.S. Cl. ........224/42.42 R, 248/23, 224/42.45 R
[51] Int. Cl. ..............................................B60r 7/00
[58] Field of Search.......224/29, 42.45, 42.11, 42.43, 224/42.42; 211/188.1, 188.8; 248/24, 23, 149, 150, 151; 108/48, 42, 44

[56] References Cited

UNITED STATES PATENTS

| | | | |
|---|---|---|---|
| 2,484,969 | 10/1949 | Stacy | 248/188.8 |
| 2,541,722 | 2/1951 | Shackelford | 211/28 |
| 2,969,900 | 1/1961 | Heuler | 224/29 |
| 2,899,162 | 8/1959 | Young | 224/42.42 |
| 2,289,695 | 7/1942 | Bryant | 248/149 |
| 3,261,520 | 7/1966 | Andersson | 224/42.1 E |
| 2,914,231 | 11/1959 | Hornke | 224/42.1 E |

Primary Examiner—Gerald M. Forlenza
Assistant Examiner—John Mannix
Attorney—George H. Baldwin and Arthur G. Yeager

[57] ABSTRACT

A rack for supportingly mounting communication and/or other related equipment within the interior of a motor vehicle with the rack being positioned over and above the vehicle's transmission and driveshaft tunnel, including a pair of generally parallel, spaced, elongated side members having forward and rearward end portions and a plurality of spaced openings therealong for the attachment of equipment to the rack, and a pair of elongated cross-members spanning generally perpendicularly between and connected to the side members adjacent their respective forward and rearward end portions, with the cross-members having a plurality of spaced openings therealong for the attachment of equipment to the rack. The rack further includes a first pair of mounting legs connected to respective side member rearward end portions and depending downward therefrom and being adapted for attachment to the vehicle floorboard, and a second pair of mounting legs connected to respective side member forward end portions and extending upward therefrom and being adapted for attachment to the vehicle dashboard.

9 Claims, 7 Drawing Figures

PATENTED AUG 22 1972

INVENTOR
Franklin L. Herrington
BY
George H. Baldwin
ATTORNEY

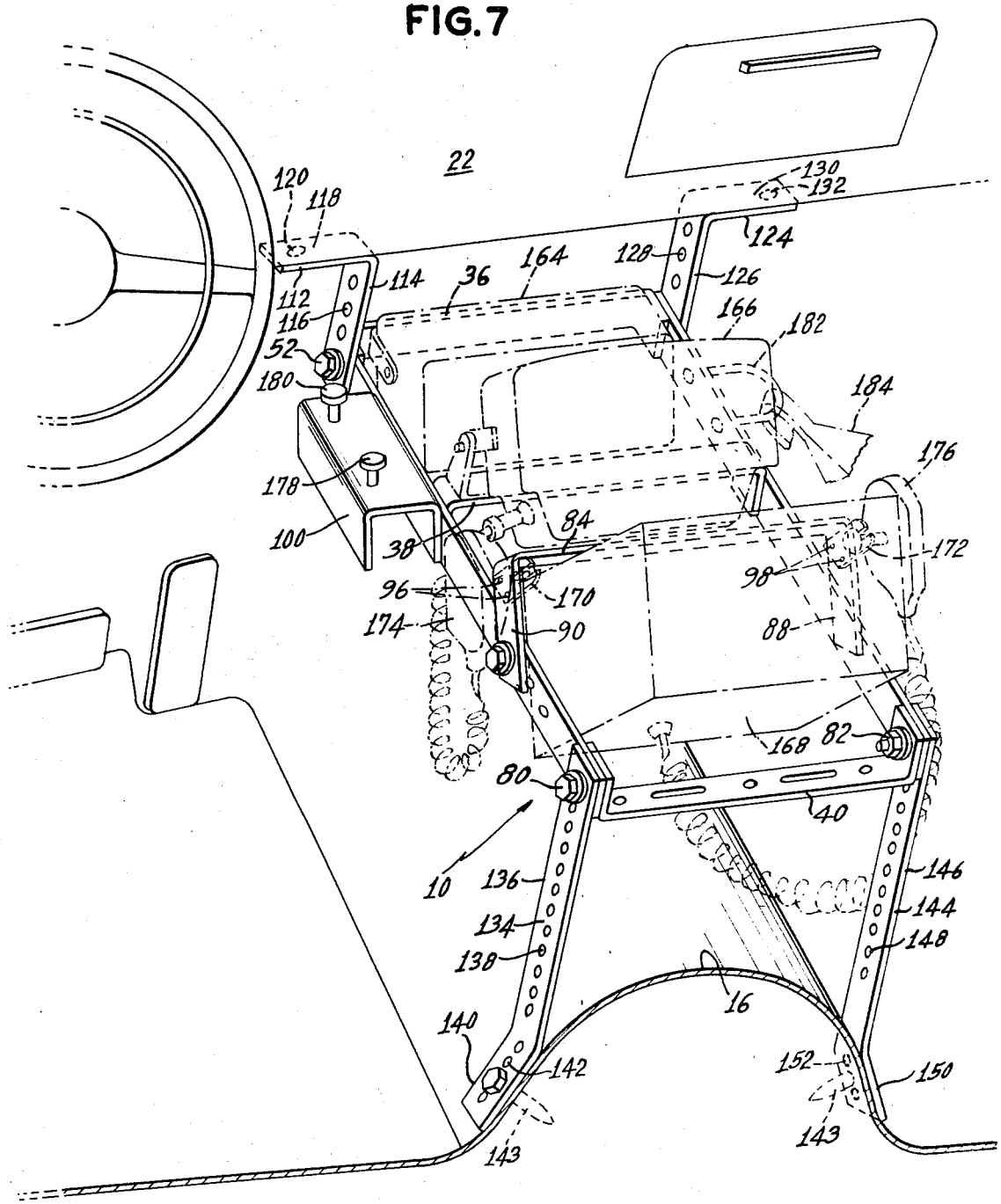

MOUNTING RACK

BACKGROUND OF THE INVENTION

1. Field of the Invention

The invention disclosed herein relates generally to a supporting and mounting means for use in the interior of vehicles for mounting communication and other related type equipment therein. In greater detail and specifics, the present invention pertains to an improved mounting rack or support for radio and other related equipment used in emergency vehicles, such as police cars, ambulances and other safety or emergency vehicles such as those used by fire departments in fire fighting operations.

The improved mounting or supporting rack of the invention is adapted and arranged to be mounted over the transmission and drive shaft tunnel or hump within the forward compartment or forward passenger portion of a motor vehicle in order to support safety equipment such as radio transmitter and receiver control heads, public address and electronic siren units, loud speakers, hand microphones, switches and the like, such that the the same are all in close proximity and convenient to the motor vehicle operator and the front seat passenger opposite the driver, while at the same time not interfering with the general comfort and space generally available to the driver and other front seat occupant of the motor vehicle.

2. Description of the Prior Art

During recent years the use of radio receiving and sending sets in safety vehicles has become increasingly popular and necessary. In many instances the instrument panel of these vehicles is not designed for and is not adequate to accommodate the sending and receiving set and all the other like communication and safety equipment that is desired or that may be necessary for use with the vehicle. Accordingly, it is often desirable that such communication, safety, or other related equipment be secured in and to other portions of the occupant compartment of such vehicles and supported from such other portions of the occupant compartment and be arranged and contained in a substantially orderly manner and at a convenient location.

With this increase and wide-spread usage of electronic and other types of communication and related equipment employed by police departments, fire departments and ambulance services there has been an increased demand for means for mounting and supporting such equipment within the interior of the front occupant containing portion of motor vehicles. Various brackets and racks have been proposed for mounting and supporting this type equipment on the front of the dashboard or on the lower portions thereof with the equipment depending therefrom, but these prior art structures have failed to provide adequate support and mounting area or room for all of the particular electronic and safety equipment now used in the heretofore mentioned vehicles, while at the same time insuring that all of the equipment is conveniently and readily accessible to both occupants of the forward passenger compartment while still providing for the comfort and availability of space for the driver and the other front seat occupant of such motor vehicles.

Radio and other type communication equipment mounting racks and supporting means have heretofore been previously devised, such prior art devices and apparatuses being generally disclosed in U.S. Pat. Nos: 2,980,379, 3,071,728, 3,087,118, 3,103,630 and 3,405,944. Applicant's invention of an improved mounting and supporting rack for communication and other related equipment, disclosed herein, is an improvement over such other prior art devices and apparatuses as shown for example in the above mentioned patents.

SUMMARY OF THE INVENTION

It is a general object of this invention to provide an improved mounting and supporting rack for use with communication, safety and other related and like equipment of the general type and variety as above set forth.

Another object of the invention is to provide an improved rack or supportingly mounting communication and other related equipment within the forward passenger compartment or forward portion of a motor vehicle with the rack and equipment mounted over the transmission and drive shaft tunnel or hump of the vehicle.

A further object of the subject invention is to provide an improved rack for supportingly mounting communication and other related equipment within the interior of a motor vehicle so that all the equipment is in close proximity and convenient to the motor vehicle operator and the other front seat passenger while at the same time not interfering with the general comfort and the space generally available to the driver and other front seat occupant of the motor vehicle.

Yet another object of the instant invention is to provide an improved rack for supportingly mounting a multitude and variety of various types of communication and other related equipment in one convenient central location within the front occupant compartment of a motor vehicle wherein ready access to all the equipment is permitted for repair thereof and all of the equipment is readily removable from the rack for replacement thereof.

In general these and other objects are attained by providing a rack for supportingly mounting communication and/or other related equipment within the interior of a motor vehicle with the rack being positioned over and above the vehicle's transmission and drive shaft tunnel, which includes a pair of generally parallel, spaced, elongated side members having forward and rearward end portions and a plurality of spaced openings therealong for attachment of equipment thereto, and a pair of elongated cross-members spanning generally perpendicularly between and connected to the side members adjacent their forward and rearward end portions, with the cross-members having a plurality of spaced openings therealong for the attachment of equipment thereto. The rack further includes a plurality of mounting legs attached to forward and rearward end portions of the side members for mounting the rack to the interior of the vehicle.

BRIEF DESCRIPTION OF THE DRAWING

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing, in which:

FIG. 7 is a perspective view showing the mounting of the equipment to the rack and the mounting of the rack in the interior of a vehicle.

DETAILED DESCRIPTION OF THE PREFERRED EMBODIMENTS

Figure 1:
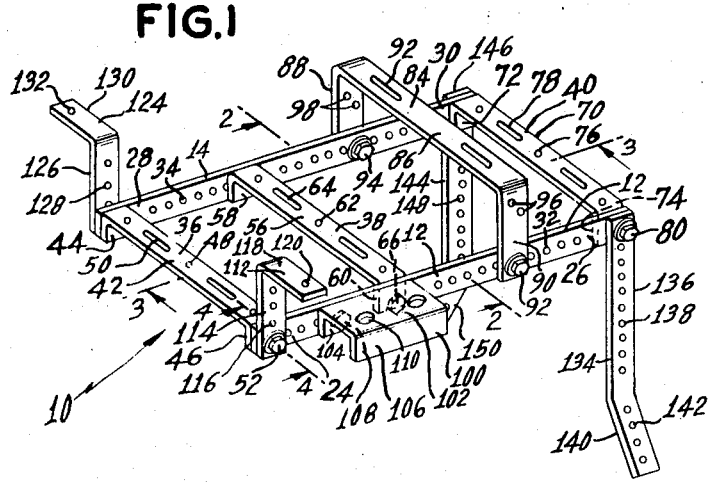
FIG. 1 is a perspective view of the improved mounting and supporting rack of this invention.

With detailed reference to the drawings and in particular to FIG. 1 thereof, the improved rack 10 for mounting and supporting communication equipment and other like safety equipment is seen to include a pair of generally parallel, elongated side bars or members 12 and 14. Elongated side members 12 and 14 are intended to be positioned over and adjacently above the hump or transmission and drive shaft tunnel 16 within the forward occupant carrying compartment or front seat portion 18 of a motor vehicle, such as a police car, an ambulance, a fire department vehicle, or other like emergency vehicle, wherein is oftentimes necessary or desirable to carry a large amount of communication and other related safety equipment, see in particular FIGS. 5 and 6.

Side members 12 and 14 are the length to conveniently fit between the forward edge of the front seat 20 and a point adjacently below and slightly forward of the face or front of the vehicle dash board or instrument panel 22, see FIGS. 5 and 6. Elongated side member 12 includes a forward end portion 24 and a rearward end portion 26, and elongated side member 14 includes a forward end portion 28 and a rearward end portion 30. The elongated side members or bars 12 and 14 are provided with holes or openings, as at 32 and 34, equally spaced therealong from respective forward end portions 24 and 28 to a point closely adjacent respective rearward end portions 26 and 30. Openings or holes, 95 at 32 and 34 are provided for securing other portions of rack 10 to the elongated side members 12 and 14 and are additionally used for mounting smaller and auxiliary pieces of equipment to the support rack 10.

Elongated side members 12 and 14 are maintained in a spaced apart, generally parallel position by cross-members or bars 36, 38 and 40. Cross-member or bar 36 is attached between the forward end portions 24 and 28 of respective side members 12 and 14, cross-member 40 is connected between the rearward end portions 26 and 30 of respective side members 12 and 14, and cross-member 38 is positioned and connected between side members 12 and 14 along the mid-portions thereof.

Cross-member or bar 36 includes an elongated central portion 42 and a pair of depending short end portions 44 and 46 connected thereto, with central portion 42 having circular and slotted openings or passageways extending therethrough, such as 48 and 50, to provide for the ready mounting of safety and communication equipment to the cross-member. Cross-member 36 is releaseably attached to side members 12 and 14 by bolt and nut combinations 52 and 54 extending through appropriate openings within respective side members 12 and 14 and appropriate openings within respective end portions 46 and 44 of member 36. Cross-member 38 includes a central elongated portion 56 and a pair 58 and 60 of depending short end portions attached thereto, with central portion 56 having circular 62 and slotted 64 openings therethrough for the ready positioning and attachment of equipment to the cross-member. Member 38 is attached to elongated side members 12 and 14 by bolt and nut combinations 66 and 68 extending through appropriate openings in respective elongated side members 12 and 14 and appropriate openings through respective depending end portions 60 and 58. Cross-member 40 includes a central elongated portion 70 and a pair 72 and 74 of depending short end portions connected thereto, with central portion 70 having circular 76 and sliding or elongated 78 passageways therethrough to readily position, accommodate and attach to cross-member 40 various pieces of communication and safety equipment. Cross-member 40 is releaseably attached to elongated side members 12 and 14 by a pair 80 and 82 of bolt and nut combinations which extend through appropriate openings within respective side members 12 and 14 and through appropriate openings within respective depending end portions 74 and 72 of member 40.

Figure 3:
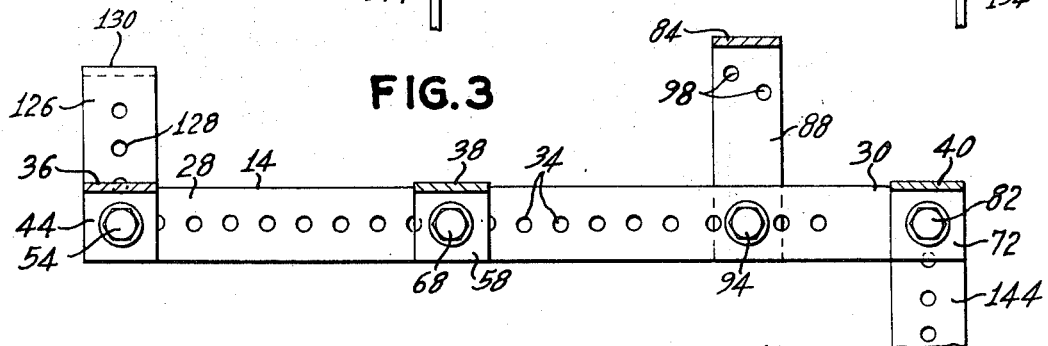
FIG. 3 is an enlarged transverse sectional view taken along line 3 — 3 of FIG. 1.

All of cross-members or bars 36, 38 and 40 are rotatable about the bolts with which they are mounted to side members 12 and 14 upon loosening of the bolt nuts, such that the central portions thereof may be positioned at any desirable angle with respect to a horizontal plane extending through the connecting bolts. This is to say, that the central portions may be positioned in a horizontal up position as depicted in FIGS. 1 and 3, a vertical position, a horizontal down position or any other angle that may be desired for the proper placement and positioning of communicating and safety equipment on rack 10 before the nuts are tightened on their respective bolts to rigidly position and secure these cross-members 36 through 40 in angular placement with respect to side members 12 and 14.

An additional or fourth elongated cross-member or bar 84 is provided which is elevated or spaced above side members 12 and 14, and includes an elongated central portion 86 and a pair of elongated end portions 88 and 90 connected thereto, with slotted openings 92 extending through central portion 86 for the ready positioning and mounting of radio and safety equipment on cross-member 84. Elongated end portions 88 and 90 are of a dimension substantially greater than the end portions of the other cross-members 36, 38 and 40. Cross-member or bar 84 is releaseably and rotatably attached to side members 12 and 14 by a pair of bolt and nut combinations 92 and 94 which extend through appropriate openings within respective end portions 90 and 88 and appropriate openings within side members 12 and 14. The angle between end portions 88 and 90 of cross-member 84 and a plane through side members 12 and 14 may be adjusted before the nuts are tightened on their respective bolts to make appropriate adjustments as may be desired to accommodate the equipment mounted on cross-member 84. After angular adjustment of member 84 nut and bolt combinations 92 and 94 are tightened to make cross-member 84 rigid with side members 12 and 14 of rack 10.

End portion 90 includes a pair of angularly aligned openings or passageways 96 for the attachment to cross-member 84 of a clip or bracket having a U-shaped opening therein for the reception and releasable holding and supporting of the hand microphone of the two-way radio which is normally mounted on rack 10. In like manner elongated end portion 88 of cross-member 84 includes a pair of angularly aligned openings 98 for the mounting on cross-member 84 and a second bracket having a U-shaped opening therein for receipt and releasably mounting or holding of a second hand microphone connected to and used with the public address system normally mounted on rack 10. The alignment of holes 96 and 98 is such that when cross-member 84 is tilted or pushed forward so that end portions 88, 90 thereof are approximately at a 45° angle to side members 12 and 14, these holes will lie at a plane generally parallel to the plane of side members 12 and 14.

Rack or support 10 further includes an inverted U-shaped angle bracket 100 rigidly attached to elongated side member 12 rearwardly adjacent of forward end portion 24 thereof. U-shaped bracket 100 includes a central upper portion 102 and a pair of depending side or end portions 104 and 106 attached thereto. Bracket 100 is fixedly secured to rack 10 by means of nut and bolt set 66 and nut and bolt set 108 extending through appropriate openings within side portion 104 and appropriate openings withing elongated side member 12. The top central portion 102 of bracket 100 includes a pair of circular openings or passageways 110 extending therethrough for the ready mounting of safety equipment to rack 10. In the normal and intended use of rack 10 a pair of switches is normally mounted in and through openings 110 within bracket 100, with one of the switches controlling the beacon light on top of the emergency vehicle and the other switch controlling the set of special back-up lights often used with the emergency vehicle.

Figure 5:
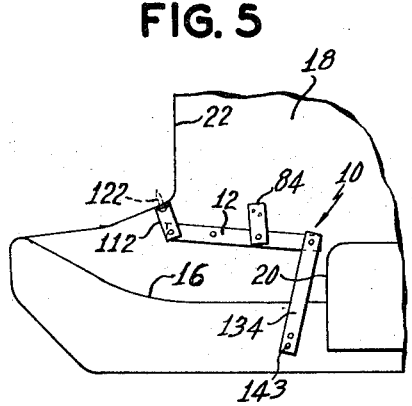
FIG. 5 is a side elevational view showing the mounting of the improved rack of this invention within the interior of the occupant compartment of a motor vehicle.

Attached to the forward end portion 24 of elongated side member 12 by means of not-bolt combination 52 is a front mounting leg 112, which is one of a pair of such legs for mounting the rack and support 10 to the underside of the front of the vehicle-dash or dashboard 22, as depicted in FIG. 5. Mounting leg 112 includes a generally upright portion 114 having holes 116 therein for use in mounting communication and safety equipment thereto and a generally horizontal portion 118 having a hole 120 therein for attachment of leg 112 and rack 10 to the underportion of the face or front of dashboard 22 within the vehicle by means of a metal screw 122, as shown in FIG. 5. A similar front mounting leg 124 is attached to the forward end portion 28 of elongated side member 14 by means of bolt and nut combination 54. Leg 124 includes a generally upright portion 126 having holes 128 therein for the mounting of safety and communication equipment thereon and a generally horizontal portion 130 having a hole or opening 132 therein for attachment of leg 124 and rack 10 to the front underportion of dash 22. Attached to the rearward end portion 26 of elongated side member 12 by bolt and nut combination 80 is a rear mounting leg 134, which is one of a pair of similar legs for mounting the rear portion of rack 10 over and to the lower sides of the hump or transmission and drive shaft tunnel, as depicted in FIG. 5. Rear mounting leg 134 includes a generally upright or vertical upper portion 136 having holes 138 therein for use in mounting communication and safety equipment thereto and a lower angular portion 140 having holes 142 therein for mounting leg 136 by a metal screw 143 to the lower side portion of the tunnel or hump 16 within the motor vehicle. A similar rear mounting leg 144 is attached to the rear end portion 30 of elongated side member 14 by means of bolt-nut combination 82. Mounting leg 144 includes an upper generally upright portion 146 having holes 148 therein for mounting communication and related equipment thereto and a lower angular portion 150 having holes 152 therein for mounting leg 144 and rack 10 by means of a metal screw to the lower side portion of the transmission and drive shaft tunnel or hump 16 within the interior of the motor vehicle.

Figure 4:
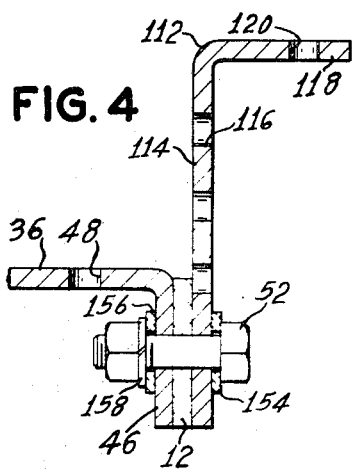
FIG. 4 is an enlarged cross-sectional view taken along line 4—4 of FIG. 1.
Figure 2:
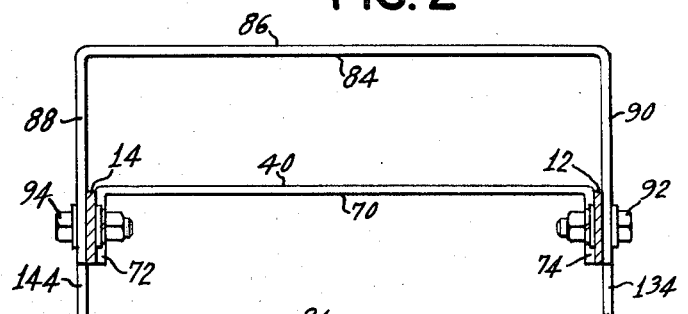
FIG. 2 is an enlarged cross-sectional view taken along line 2 — 2 of FIG. 1.

All of the bolt and nut combinations, as bolt-nut combination 52 seen in FIG. 4, include an outer washer 154, an inner washer 156 and a lock washer 158 positioned between the head of the bolt and the nut. After all communication and safety equipment has been mounted on rack 10 and the rack installed within the interior of the motor vehicle, all bolt-nut combinations are normally tightened and secured to provide a completely unified rack 10, which is a rigid and solid structure and support for the communication and related safety equipment mounted thereon.

Figure 6:
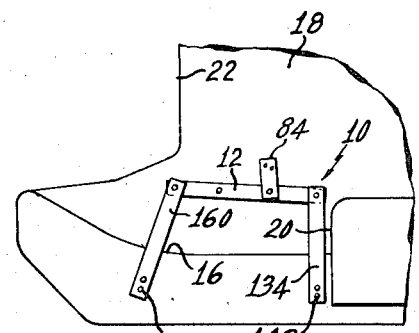
FIG. 6 is a side elevational view showing the mounting within the interior of the occupant compartment of a vehicle of a second embodiment of this invention.

A second embodiment of the improved rack or support 10 of this invention is depicted in FIG. 6. The rack 10 of the embodiment shown in FIG. 6 is used and employed in vehicles in which the vehicle dash or dashboard is constructed of plastic or is otherwise too weak or insufficient to readily attach the forward end portion of rack 10 thereto and support the same and the communication and safety equipment mounted on the rack. In this embodiment the front mounting legs 112 and 124, as seen in FIGS. 1 through 5, have been replaced by a pair, as at 160 of depending and generally upright mounting legs similar to rear mounting legs 134 and 144. In this manner the forward end portion of rack 10 may be mounted similar to the rearward end portion thereof, with the pair 160 of front mounting legs straddling and secured to the lower side portions of the hump or transmission and drive shaft tunnel formed within the interior of the forward passenger section of the vehicle by metal screws, as at 162. Again as with the previously described embodiment, once the rack has been secured within the interior of the vehicle and the equipment mounted thereto the bolt and nut combinations thereof, and particularly at the corners connecting the mounting legs, are tightened and secured such that the rack becomes a unified, rigidified and solid structure.

In a typical installation within a police vehicle or patrol car, the equipment that might normally be found mounted on improved rack or support 10 and used in conjunction therewith would include a loud speaker 164 mounted to cross-member 36 used in conjunction with the receiving portion of the two-way communication radio, a radio control head 166 mounted to cross-member 38 for controlling both the sending and receiving of the two-way radio used in conjunction therewith, a combination electronic siren and public address system unit 168 mounted to the underside of elevated cross-member 84, hooks or brackets 170 and 172 attached respectively to the elongated depending end portions 90 and 88 of cross-member 84 for receiving and releasably supporting a pair 174 and 176 of hand microphones used in conjunction with the public address system and the sending portion of the two-way communication radio, a pair 178 and 180 of switches mounted within holes 110 of bracket 100 for controlling the beacon light on the top exterior of the vehicle and a special set of back-up lights on the rear exterior of the vehicle, and a U-bolt 182 mounted to elongated side member 14 opposite bracket 100 for receiving and releasably supporting a hand-held spot or search light 184. Other communication and safety equipment may be further mounted to rack 10 as may be needed and desired, such as additional speakers mounted to the rear supporting and connecting legs 134 and 144 either exteriorly thereof or interiorly thereof, and the like.

The improved rack or support 10 of this invention has many advantages over prior art devices and the presently known methods of attaching the communication and safety equipment to the front and underside of the vehicle dash or dashboard. Among these advantages is included, the ability to mount and support a multitude and variety of various types of communication and safety equipment in one central location, in a minimum of space to give maximum efficiency, convenient to the use of both occupants of the front seat of the vehicle, while still not interfering with the space, comfort and maneuverability for driving and other purposes of the front seat occupants. Additionally, the improved rack permits easy access to the equipment for repair thereof and easy removal for replacement of the pieces of equipment mounted thereon. Also the mounting of equipment on the improved rack of this invention permits the easy wiring and connection and the shortening of electrical cables leading thereto, and minimizes the breakage by eliminating wire vibration of wires leading to the equipment mounted thereon, which is a major problem in vehicles in which the equipment is mounted on the front or up underneath the dash of the vehicle. When the rack and support of this invention is employed and the vehicle in which it is mounted is involved in a collision, the equipment being mounted in a central, more or less, protected area of the vehicle, usually survives the collision without being damaged which is not the case in the present known mounting arrangements.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of this invention.

What is claimed as new and what is desired to secure by Letters Patent of the United States is:

1. A rack for supportingly mounting communication and/or other related equipment within the interior of a motor vehicle with the rack being positioned over and adjacently above the vehicle's transmission and drive shaft tunnel, comprising in combination, a pair of generally parallel, spaced, elongated flat bar side members having major faces vertically disposed, each said side member having a forward and rearward end portion and a plurality of horizontally extending openings spaced therealong for the attachment of equipment to the rack, a pair of elongated flat bar cross-members having central body portions spanning generally, horizontally and perpendicularly between said side members adjacent respective said forward and rearward end portions, each said cross-member having vertical end portions each engaging one of said major faces and being attached to said members respectively, said cross-members maintaining said side members in a spaced and generally parallel relation, each said cross-member having a plurality of spaced openings along said central body portion thereof for the attachment of equipment to the rack, and a plurality of flat bar mounting legs each having a respective end portion engaged against a respective one of said major faces of said side members and being respectively attached at said end portion to respective forward and rearward end portions of said pair of side members, and means for attaching the respective other ends of each said legs to the interior of the vehicle.

2. The rack as defined in claim 1 wherein said plurality of mounting legs includes four mounting legs, two of said mounting legs being attached to respective forward and rearward end portions of one of said pair of side members, the other two of said mounting legs being attached to respective forward and rearward end portions of the other of said pair of side members, said pair of elongated cross-members spanning generally perpendicularly between said pair of side members and being attached thereto in general alignment with said mounting legs.

3. The rack as defined in claim 1 further comprising another cross-member extending generally perpendicularly between said side members and having opposite end portions respectively connected to opposite said side members adjacent their mid-portions, said other cross-member having a plurality of spaced openings therealong for the attachment of equipment thereto.

4. The rack as defined in claim 1 wherein said plurality of mounting legs includes four mounting legs, two of said mounting legs having their upper end portions connected to respective rearward end portions of said pair of side members and depending generally vertically downward therefrom and being adapted for attachment of their lower end portions to the floorboard of the vehicle, the other two of said mounting legs having their lower end portions connected to respective forward end portions of said pair of side members and extending generally upward therefrom and being adapted for attachment of their upper end portions to the dashboard of the vehicle.

5. The rack as defined in claim 1 wherein said plurality of mounting legs includes four mounting legs, two of said mounting legs having their upper end portions connected to respective rearward end portions of said pair of side members and depending generally vertically downward therefrom and being adapted for attachment of their lower end portions to the floorboard of the vehicle, the other two of said mounting legs having their upper end portions connected to respective forward end portions of said pair of side members and depending generally vertically downward therefrom and being adapted for attachment of their lower end portions to the floorboard of the vehicle.

6. The rack as defined in claim 1 further comprising an inverted U-shaped bracket having a pair of opposed, spaced generally upright side portions and a top portion spanning between said side portions, one of said pair of side portions of said bracket being attached to one of said pair of side members along its mid-portion and the other of said side portions being spaced outwardly of said one side member and the side of the rack, said top portion of said bracket including an opening for the attachment of equipment thereto.

7. The combination according to claim 1 wherein each said leg is individually bolted to the respective side member by a horizontal bolt on which the leg is pivotally adjustable when the bolt is loosened and by which it is rigidly attached when the bolt is tightened.

8. A rack for supportingly mounting communication or the like equipment within the interior of a motor vehicle with the rack being positioned over and adjacently above the vehicle's transmission and drive shaft tunnel, comprising in combination, a pair of generally parallel spaced elongated side members, each said side member having a forward and rearward end portion and a plurality of spaced openings therealong for attachment of the equipment to the rack, a pair of elongated cross-members extending generally perpendicularly between and connected to said side members adjacent respective said forward and rearward end portions, said cross-members maintaining said side members in a spaced and generally parallel relation, a plurality of mounting legs attached to said forward and rearward end portions of said pair of side members mounting the rack of the interior of the vehicle, and an elongated U-shaped cross-member extending generally perpendicularly of said pair of side members and comprising a generally horizontal central portion and a pair of vertically extending opposite end portions respectively attached to said opposite side members and supporting said central portion at an elevation vertically displaced from the general plane of said side members, said central portion having a plurality of spaced openings therealong for the attachment of equipment thereto.

9. The rack as defined in claim 8 further comprising selectively pivotal connecting means extending between each of said pair of end portions of said other cross-member and said side members to permit selected movement between said end portions to said other cross-member and said side members.

* * * * *